(12) United States Patent
Chu

(10) Patent No.: US 6,855,088 B1
(45) Date of Patent: Feb. 15, 2005

(54) SPEED CONTROL MECHANISM FOR MODEL CARS

(76) Inventor: Daimler Chu, PO Box 82-144, Taipei (TW)

( * ) Notice: Subject to any disclaimer, the term of this patent is extended or adjusted under 35 U.S.C. 154(b) by 0 days.

(21) Appl. No.: 10/409,053

(22) Filed: Apr. 9, 2003

(30) Foreign Application Priority Data

May 22, 2002 (TW) .................................. 91207369 U

(51) Int. Cl.[7] .......................... F16H 48/06; F16H 37/06
(52) U.S. Cl. ..................................... 475/230; 74/665 R
(58) Field of Search ........................ 74/665 R; 475/220, 475/230, 243, 245–247

(56) References Cited

U.S. PATENT DOCUMENTS

| | | | | |
|---|---|---|---|---|
| 4,793,211 A | * | 12/1988 | Schmidt | 475/246 |
| 4,959,043 A | * | 9/1990 | Klotz et al. | 475/230 |
| 5,338,247 A | * | 8/1994 | Miles | 446/456 |
| 5,718,653 A | * | 2/1998 | Showalter | 475/230 |
| 5,897,453 A | * | 4/1999 | Mimura | 475/246 |
| 5,976,050 A | * | 11/1999 | Irwin | 475/230 |
| 6,093,127 A | * | 7/2000 | DiDomenico et al. | 475/230 |
| 6,367,345 B1 | * | 4/2002 | Yeh | 74/377 |
| 6,702,703 B2 | * | 3/2004 | Gervais et al. | 475/160 |

OTHER PUBLICATIONS

Dudley et al., "Which Right–Angle Gear System", 1970, Gear Design, pp. 44–46.*

* cited by examiner

*Primary Examiner*—Roger Pang
(74) *Attorney, Agent, or Firm*—Leong C. Lei

(57) ABSTRACT

A speed control mechanism for model cars is disclosed. The mechanism comprises a housing and a cover, which are connectable to each other and are respectively provided with a pivot for connecting to a wheel. And, helical gears are provided on each end of the pivot so as to engage with the gear set in the housing. The gear set is composed of a positioning base and a plurality of bevel gears. By way of the engagement and transmission of the helical gears and the bevel gears, the pivots may provide excellent speed control, as well as sufficient twist force, to prevent wheels from slipping at the time of turning.

1 Claim, 5 Drawing Sheets

SPEED CONTROL MECHANISM FOR MODEL CARS

FIELD OF THE INVENTION

The present invention relates to a speed control mechanism for model car, which may provide sufficient twist force and excellent speed control and is applicable to remote control car, model cars and the like.

DESCRIPTION OF THE PRIOR ART

Remote control cars used to be popular for entertainment purposes. As shown in FIG. 1, a speed controller for a remote control car usually comprises a casing A provided with four worm gears C, each of which is provided with a bevel gear C1 on the upper and lower ends, respectively. Two shafts each containing with a worm gear B1 are provided in-between the worm gears C such that the upper and lower bevel gears C1 of the adjacent worm gears C may engage with the corresponding upper and lower bevel gears C1 and thereby generating apparent speed difference when the bevel gears C1 rotate and therefore avoid wheels from slipping. However, given the parallel engagement of the bevel gears, twist force generated is not great.

SUMMARY OF THE INVENTION

The primary object of the invention is to provide a speed control mechanism for model cars, which can generate sufficient twist force.

Another object of the invention is to provide a peed control mechanism for model cars, which has excellent function in speed adjustment.

To reach the above purposes, the invention basically includes a housing and a cover, which are connectable to each other and are respectively provided with a pivot in the center. A bearing is provided outside of the cover and the housing; and bevel gears are provided inside of the cover and the housing. A gear set consisting of a plurality of helical gears and a positioning base is provided inside of the housing. The gear set is engaged with the bevel gears inside of the housing and the cover, thereby with the engagement and transmission of the helical gears and the bevel gears, the pivots may provide excellent speed control, as well as sufficient twist force, to prevent wheels from slipping at the time of turning.

The novelty and many other advantages of the invention will become more readily appreciated as the same becomes better understood by reference to the following detailed description, when taken in conjunction with the accompanying drawings.

DETAILED DESCRIPTION OF THE PREFERRED EMBODIMENTS

Figure 1:
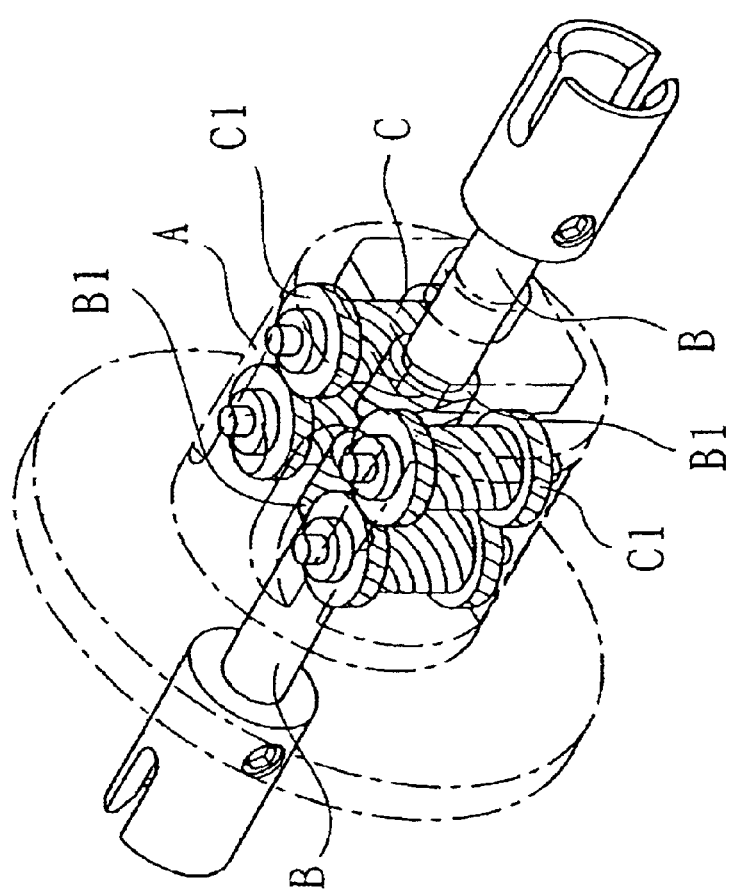
FIG. 1 is an exploded view of a prior art.

FIG. 1 shows a conventional speed controller, the structure thereof is as mentioned above.

Figure 3:
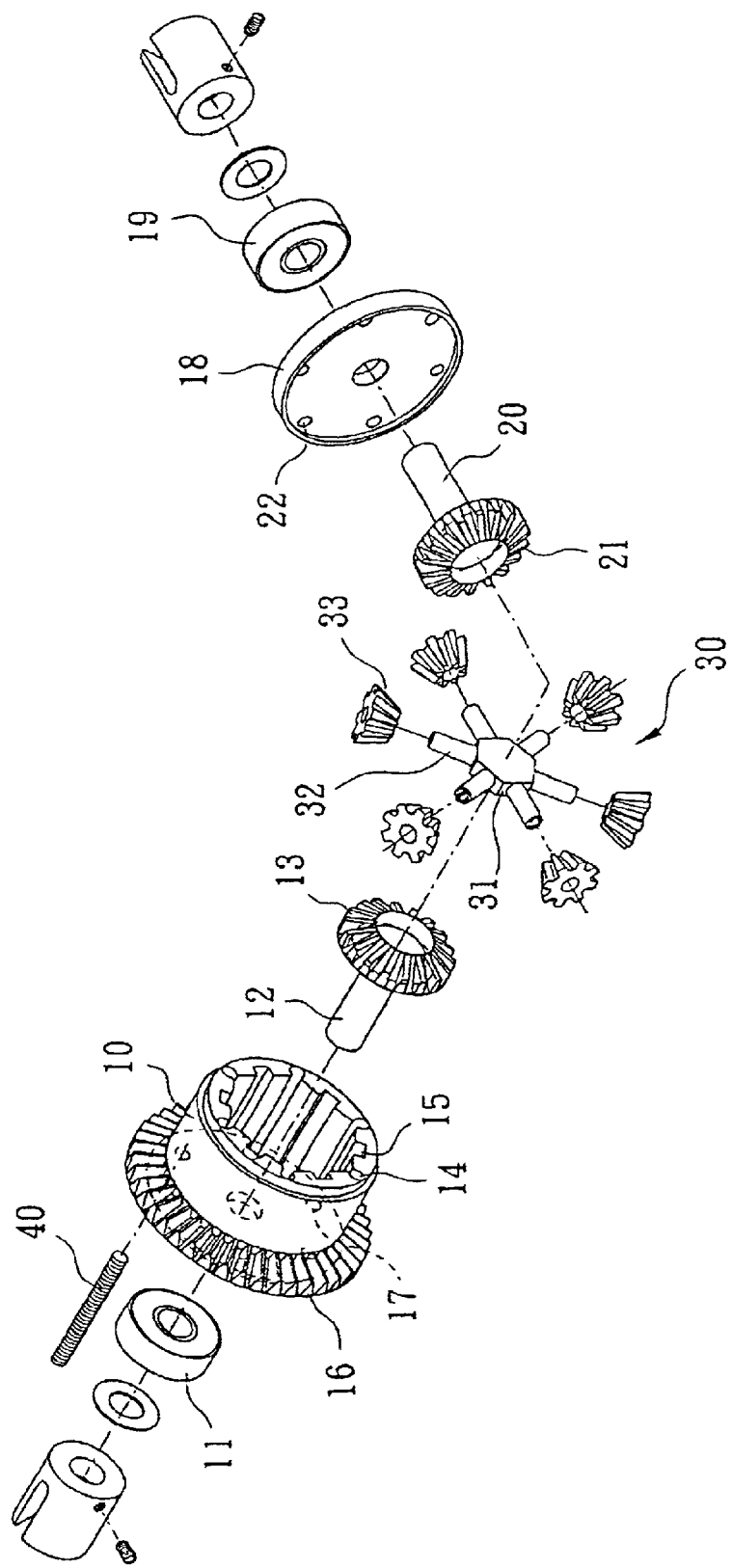
FIG. 3 is an exploded view of the present invention.

Referring to FIG. 3, the present invention primarily comprises a housing 10 and a cover 18, which are connectable to each other. The cover 18 is provided with a plurality of bolt holes 22 and a pivot 20 passing through the center of the cover. The pivot 20 is connected to a bearing 19 and then pivotally provided on the cover 18 with the end adjacent to the cover 18 mounted with a bevel gear 21, such that when the bevel gear 21 rotates, the pivot 20 rotates likewise. A pivot 12 is provided on the central bottom of the housing 10 and is connected to a bearing 11 and then pivotally provided on the housing 10 with the end adjacent to the housing 10 mounted with a bevel gear 13. The interior wall of the housing 10 is equidistantly provided with bole holes 14 and grooves 15. A gear wheel 16 is extruded from the bottom rim of the housing 10. The bore holes 14 are corresponding to the bolt holes 17.

A gear set 30 consists of a positioning base 31 and a plurality of helical gears 33. The positioning base 31 is substantially in the form of a hexagon block with each side centrally extruded with an axle 32. Each axle 32 is provided with a helical gear 33 with the smaller taper towards the positioning base.

Figure 2:
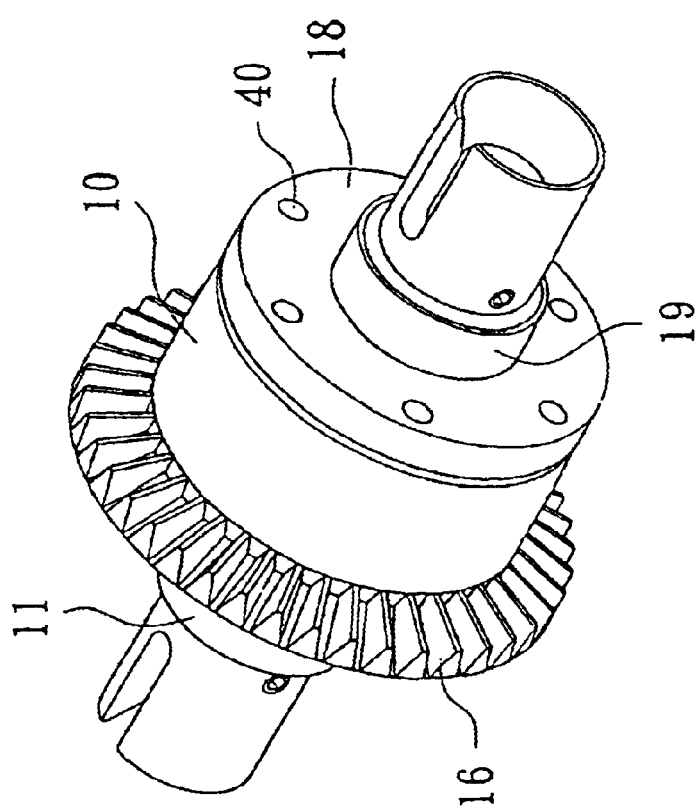
FIG. 2 is a perspective view of the present invention.

To place the gear set 20 assembled with via the above-mentioned helical gears 33 and the positioning base 31 into the housing 10, the axles 32 must be aimed at the grooves 15 on the interior wall of the housing 10, so that the entire gear set 30 can be inserted into the housing 10 and the plurality of helical gears 33 can engage with the bevel gears 13 on the bottom of the housing. The cover 18 is mounted on the opening of the housing 10 such that the plurality of bolt holes 22 on the cover 18 are aimed at the bore holes 14 on the interior wall of the housing 14. Bolts 40 are screwed into the bolt holes 17 on the bottom of the housing 14 through the cover 18, as shown in FIG. 2.

Figure 4:
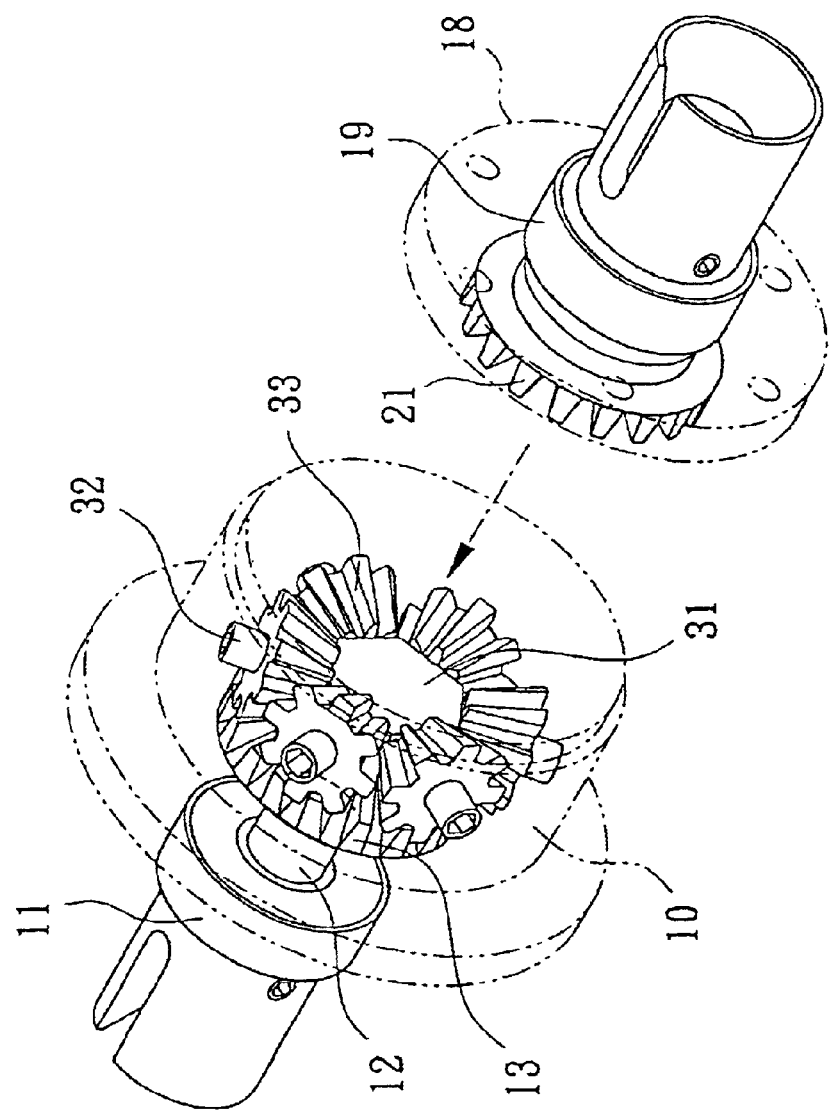
FIG. 4 is an exploded view of the present invention.
Figure 5:
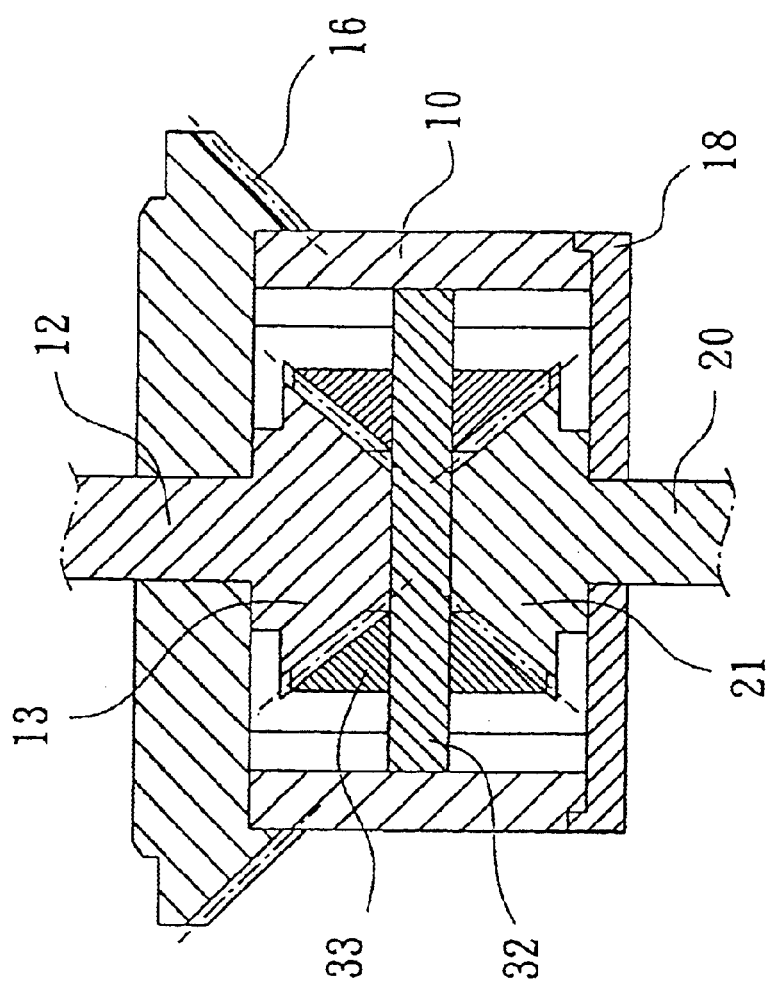
FIG. 5 is a cut-away view of the present invention.

As shown in FIGS. 4 and 5, the gear set 30 laterally provided inside the housing 10 is and the pivots 12, 20 vertically provided before and behind the housing 10 are vertically connected, so that when the model car is actuated with the front and back bevel gears 13, 21 and the plurality of helical gears 33 come into touch, the motive force of the motor can be transmitted through the gear wheel 16 to the wheel and operate the model car to move linearly. When the model car is about to turn, by way of the engagement of the helical gears 33 and bevel gears 13, 21, as well as the match of the housing 10 and the bearing 11, 19 outside of the cover 18, the pivots 12, 20 may obtain excellent control on speed difference to enable the model car turn smoothly.

The present invention has the following advantages:

1. By way of the engagement of the helical gears and the bevel gears by an angle of 45°, the interaction of the gears may generate maximum twist force. Accordingly, when the model car is actuated and in turning, the slip and idle running of the wheels can be efficiently avoided.

2. In the prior art, the helical gears and the flat gears are contacted linear by surface. The helical gears and bevel gears according to the present invention are contacted surface by surface in order to improve the disadvantage of wearing under high-speed operation.

3. A bearing is additionally provided in-between the pivots and the bevel gears such that the friction between the bevel gears and helical gears can be efficiently reduced.

Concluded above, in the speed control mechanism for model cars according to the invention, given that the helical gears and bevel gears are contacted surface by surface and that the pivots are connected to the bevel gears through a bearing, it is novel to the integral space of a speed control mechanism for the present model cars, and the efficiency is highly improved. Accordingly, the inventor has claimed his invention.

Although specific embodiments have been illustrated and described, it will be obvious to those skilled in the art that various modifications may be made without departing from what is intended to be limited solely by the appended claims

What is claimed is:

1. A speed model mechanism for model cars comprising:

a housing having an interior wall which is equidistantly provided with bore holes and grooves;

a cover connectable with said housing, said cover being provided with a plurality of bolt holes aligned with said bore holes;

a first pivot passing through a center of said cover, said pivot being connected to a first bearing and then pivotally provided on said cover, an end of said first pivot being mounted with a first bevel gear so that said first pivot will be rotated in unison with said first bevel gear;

a second pivot provided on a center bottom of said housing and connected to a second bearing, said second pivot being pivotally provided on said housing, an end of said second pivot being mounted with a second bevel gear so that said second pivot will be rotated in unison with said second bevel gear;

a gear wheel extruded from a bottom rim of said housing; and a gear set having a positioning base and a plurality of helical gears, said positioning base being in a form of a hexagon block with each side centrally extruded with an axle, each axle being provided with a helical gear with a smaller taper towards a positioning base.

* * * * *